March 5, 1935. C. J. G. AARTS ET AL 1,993,641
METHOD OF MAKING BORE HOLES
Filed March 15, 1933 3 Sheets-Sheet 1
FIG:1
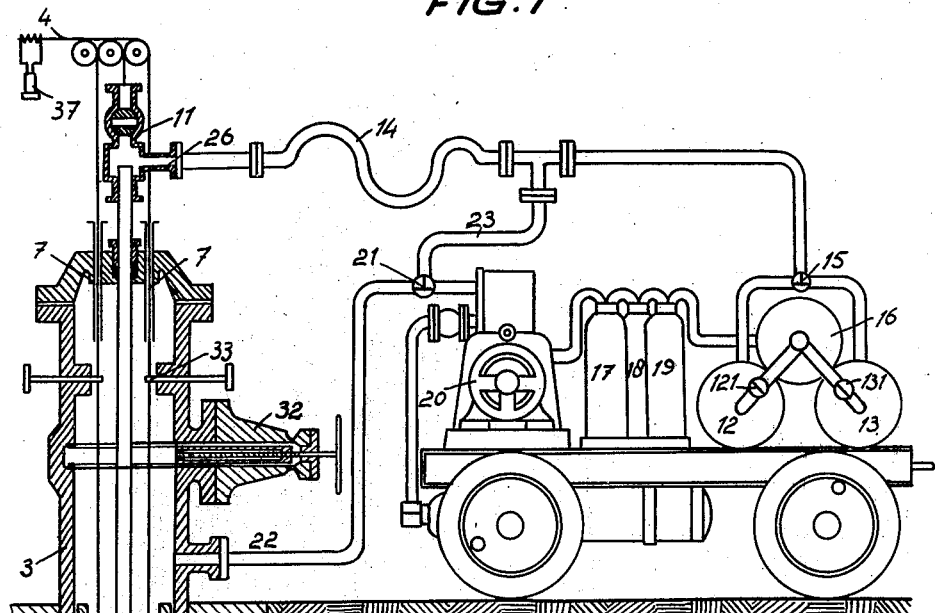
FIG:2
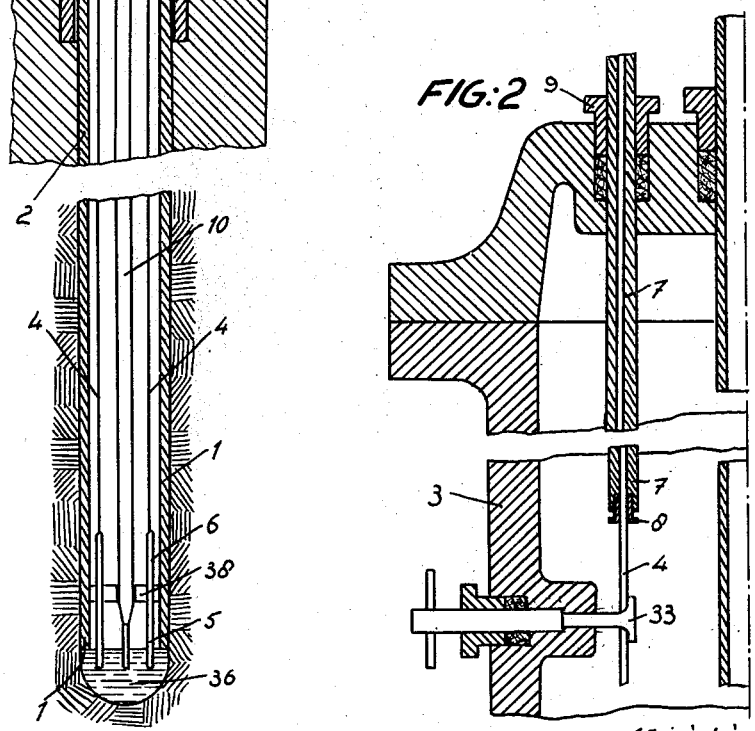
Inventors:
Christianus J. G. Aarts
and Johannes A. A. Nekel
By ... Attorney.

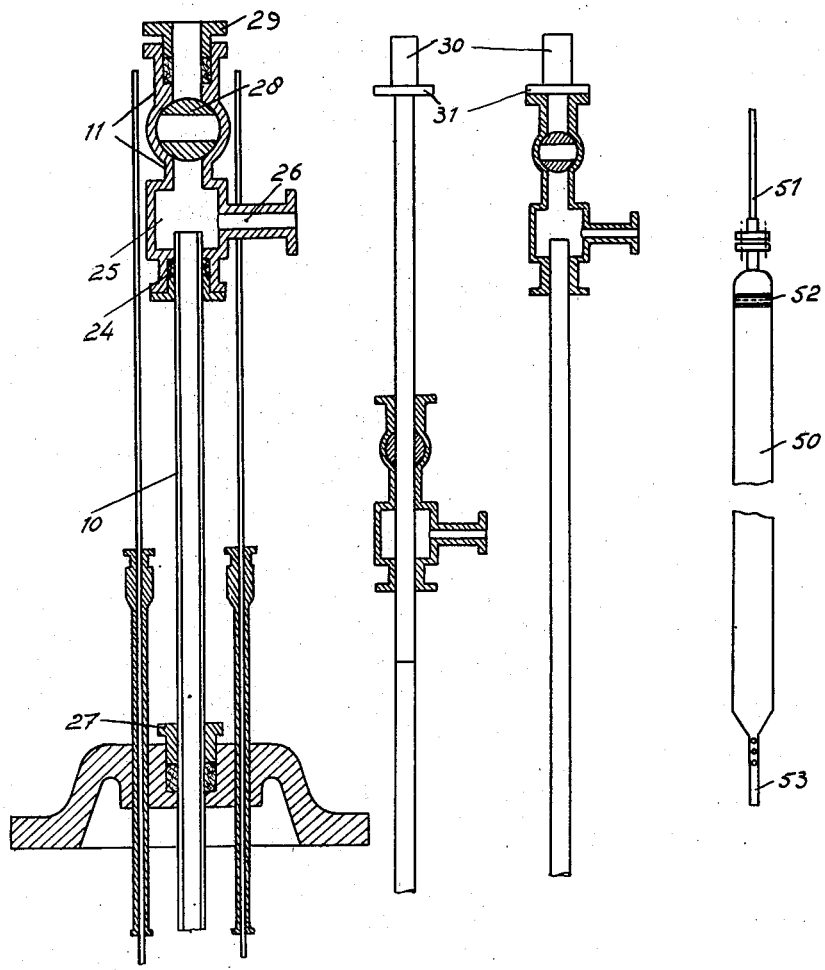

March 5, 1935.  C. J. G. AARTS ET AL  1,993,641
METHOD OF MAKING BORE HOLES
Filed March 15, 1933  3 Sheets-Sheet 3
FIG:6
FIG:7
FIG:9
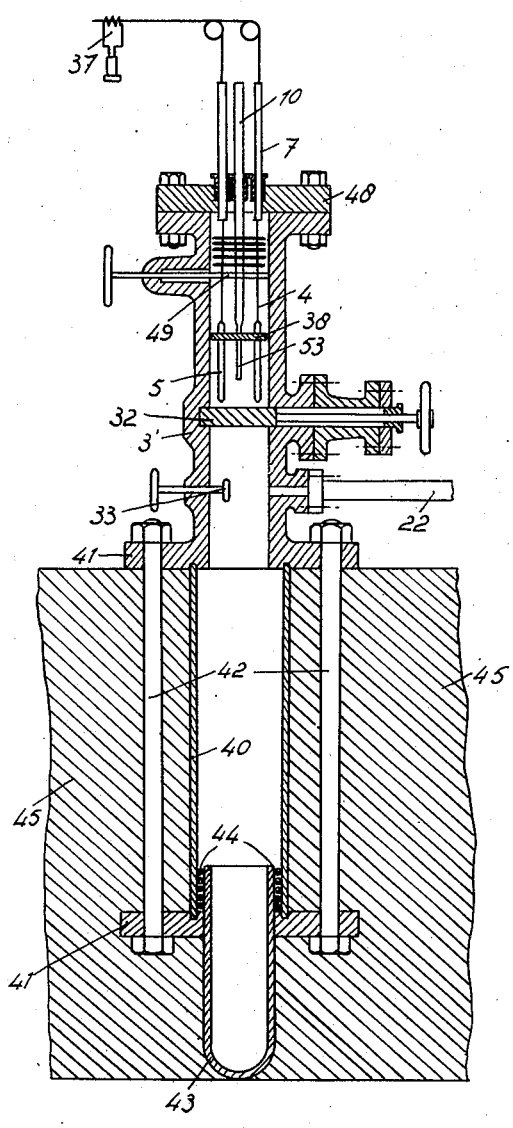
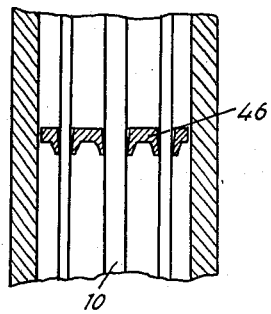
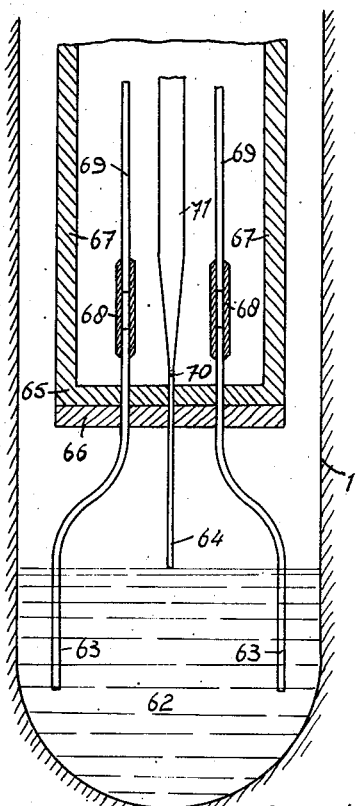
Inventors:
Christianus J. G. Aarts
and Johannes A. A. Hekel
By ———— Attorney Patented Mar. 5, 1935

1,993,641

UNITED STATES PATENT OFFICE 1,993,641

METHOD OF MAKING BORE HOLES

Christianus Josephus Godefridus Aarts, Voorburg, and Johannes Antonius Alphonsus Mekel, Delft, Netherlands, assignors, by direct and mesne assignments, to Naamlooze Vennootschap Smeltboring, Rotterdam, Netherlands Application March 15, 1933, Serial No. 660,958
In Germany March 19, 1932

19 Claims. (Cl. 255—1)

This invention relates to methods of making bore holes and more particularly has reference to methods involving the application of heat to the material in which the hole is to be made to melt the material and the removal of the molten material to form the hole.

An object of this invention is to provide a method of forming bore holes by the application of heat in which the heating is effected by passing electric current through a body of molten slag from electrodes immersed therein.

Another object of this invention is to provide a method of forming bore holes comprising applying heat to the material in which the hole is to be formed by passing electric current through a body of molten slag in contact therewith, applying pressure to the heated zone and removing a part of the slag as the body thereof increases.

Yet another object of the invention is to remove molten slag from bore holes, formed by the application of a melting heat to the material in which the hole is to be made, by the application of gaseous pressure.

Still another object of the invention is to remove molten slag from bore holes, formed by the application of a melting heat to the material in which the hole is to be made, by the circulation of a gas through the bore hole.

A further object of the invention is to provide a method of initiating the application of heat in the boring of holes by the melting of the material in which the hole is to be made, which consists in heating a body of slag or similar material to a molten condition and then causing electric current to flow between electrodes immersed in the molten slag to effect further heating thereof.

A still further object of this invention is to carry out the boring of holes in earth or other material by the melting of the same under pressure of inert or reducing gases.

With these and other important objects in view, which may be incident to our improvements, the present invention consists in the steps and combinations of steps to be hereinafter set forth and claimed, with the understanding that the several steps comprising our invention may be varied and modified, wtihout departing from the spirit and scope of the appended claims.

The present invention comprises the methods of boring holes in earth or other material by melting the earth and removing the molten material from the hole or crater formed. The molten material may be bodily removed from the hole or it may be partly forced into the porous surrounding material. Generally a part of the molten material remains in the bore hole to form the wall thereof after solidification.

In carrying out the present invention, the heating is preferably effected by the passage of electrical energy between spaced electrodes immersed in a body of molten slag. In initiating the heating procedure, powdered slag, glass or other material may be packed around the spaced electrodes and heated by external means to effect the melting thereof. When the mass has become molten, then the current can be applied to the spaced electrodes and further heating will result from the passage of current between the immersed electrodes.

The present invention further embodies the feature of removing slag from the bore hole by means of a circulating stream of gas which aspirates the molten slag and carries it upwardly out of the hole. A further feature of the present invention consists in the maintaining of an inert or reducing gas in the bore hole. The gas may be introduced into the bore hole in its desired state or hydrocarbons may be added and cracked to produce the desired gases. The circulating gases which remove the slag from the bore hole may be treated so as to separate the slag therefrom. After the separation of slag from the gases, they may be further purified for recirculation.

In order to make our invention more clearly understood, we have shown in the accompanying drawings means for carrying the same into practical effect without limiting the improvements in their useful applications to the particular constructions which, for the purposes of explanation, have been made the subject of illustration.

In the drawings:

Figure 1 is a more or less diagrammatic view, partly in section, of a complete plant for making deep bore holes according to one form of this invention.

Fig. 2 is an enlarged fragmentary sectional view taken through the pressure-resisting top chamber of the bore hole.

Fig. 3 is a vertical sectional view taken through the cover of the top chamber of the bore hole and part of the electrodes, the exhaust tube and the device for extending the exhaust tube.

Figs. 4 and 5 are detail views, partly in section, of the exhaust tube and the extending device in different positions.

Fig. 6 is a vertical sectional view of a somewhat diagrammatical apparatus showing another form of pressure top chamber connected with the bore hole proper.

Fig. 7 is a fragmentary vertical sectional view of a part of the bore hole showing in detail a device to ensure the relative position of the pending conductors.

Fig. 8 is a side view of a device which may be used for removing material from the bore hole, if no exhaust tube is used.

Fig. 9 is a vertical sectional view taken through the lower part of the bore hole made with one form of apparatus according to this invention.

In Fig. 1 of the drawings, a fragmentary sectional view of a bore hole is shown being drilled in accordance with the present invention with apparatus suitable for the purpose. As is known, rock or other silicious material is a non-conductor for electricity when in the solid state, but when heated to a molten state it becomes conductive and is maintained in the molten state by the heating effect of the electrical current passed therethrough. For applying the melting heat to the rock, earth or other material in which the bore hole is to be formed, the present invention contemplates the formation and provision of a pool of molten rock or other material over the spot in which the bore hole is formed. To this end, a plurality of tungsten electrodes 5 are positioned in spaced apart relation in a pool of molten slag. The heating, in accordance with this invention, is effected by the passage of electrical energy between the electrodes 5, which are immersed in spaced apart relation in the molten pool of slag 36.

The molten slag generally has a resistance of the order of 1 ohm for a distance of the electrodes of 10 cm., so that it is easy to provide a large amount of energy in the small space of the molten slag. To prevent heat losses and to protect the current conductors against radiant heat, a refractory sheet 38 is provided a little above the highest level of the slag through which the electrodes pass and which may be composed of zirconium oxide, quartz or other refractory material.

Electrical energy is supplied to the electrodes 5 by means of conductors 4 which are suspended from a structure above the surface in which the hole is to be formed. Preferably the conductors 4 are wound on drums so that the electrodes may be lowered as the boring process proceeds.

The current may be obtained, for instance, by a generator mounted on a tractor and driven by an oil engine. The tractor may also carry a switchboard with volt meter and ammeter and the drums carrying the current conductors 4. A telephone 37 is provided to indicate when the electrodes come out of the slag.

In Fig. 1 the electrodes are shown connected to a three-phase alternating current supply system. In this instance, there are three electrodes which are spaced equidistantly apart to obtain the best heating effect in the pool of molten material. Of course, as shown in Fig. 6 a two electrode system may be employed.

The electrodes 5 are connected to the conductors 4 by connections 6 of molybdenum or nickel. In the beginning of the boring or after replacing the electrodes by new ones, it is necessary to provide a pool of molten slag so that the electric current will flow between the electrodes. For this purpose, the electrodes may be connected by a resistance wire of nichrome embedded in an easily fusible substance, such as glass powder. The resistance wire is brought to incandescence and causes the melting of the glass. The glass becomes conductive and forms an electrically conductive slag in which the electrodes are immersed. The melting thus started maintains itself.

The boring action is carried out by applying a pressure above the pool of molten material. As shown in Fig. 1, this is effected by positioning a pressure top chamber 3 over the hole. An intermediate reinforcing structure 2 is shown to prevent the pressure leaking between the chamber and the material in which the bore is made.

Chamber 3 has openings formed in its top through which the conductors 4 extend. As shown in detail in Fig. 2, tubes 7 are slidably fitted in the openings provided in the top of chamber 3 and the conductors 4 are passed through the tubes 7. A gland stuffing box 8 is provided at lower ends of the tubes 7 to prevent leakage if gases between the tubes 7 and the conductors 4. Similarly, gland stuffing boxes 9 are provided to prevent leakage between the top of chamber 3 and the tubes 7.

The lowering of the electrodes in the bore hole is effected by lowering the tubes 7. However, as soon as the upper end of tubes 7 comes near to the gland 9, the conductor 4 can be retained in its position by clamping means 33 within the top chamber which may be controlled from the outside, so that the tubes 7 can be lifted up without lifting the conductor. As soon as the tube 7 is again in its highest position, the clamping means 33 are removed and the tube with a conductor can be lowered uniformly.

The pressure top chamber 3 is provided with a gate valve 32 which may be shut if the electrodes 5 and tube 10 are lifted up above said valve, for instance, if new electrodes are needed. When the valve 32 is closed, the pressure in the bore hole is maintained and the cover of the chamber 3 may then be removed and the electrodes or the ejector removed and replaced, if desired. Of course, conductors 4 must be electrically insulated from the top of chamber 3.

Since the boring is carried out under pressure, a part of the molten rock or other material is forced into the more or less porous surrounding strata. The wall 1 of the bore is formed of the hardened molten material. As the depth of the bore is increased, it becomes necessary to remove a portion of the pool of molten material so that the application of heat can be more concentrated. This invention contemplates the removal of the molten slag by passing a current of gas up through a tube and aspirating slag into the up-flowing gas stream.

For this purpose, a tube 10 is provided having an ejector connected to its lower end, i. e., the tube 10 is connected to a small tube of refractory material open at its lower end and having small perforations near the place where it is connected to the tube 10 through which gas may enter tube 10. If a rapid gas current ascends through tube 10, it aspirates the molten slag, atomizes it and lifts it in atomized condition upwards. The tube 10 discharges in a structure 11 which alternatively may be connected by means of a three-way valve 15 with one of the two high pressure chambers 12 and 13, in which the powder resulting from the atomized slag is deposited. The body 11 and the high pressure chambers are connected by a flexible tube 14, which permits the body 11 to be lifted and lowered without breaking the connection.

From the high pressure separating chamber 12 or 13, the gas passes through a valve 121 or 131 to the low pressure chamber 16. If one of the valves 121 or 131 is opened, a gas current is established in tube 10 and therefore exhaust of the slag takes place if one of these valves is periodically opened. From the low pressure chamber 16, the gas passes through purifying means 17, 18 and 19 to the compressor 20. In 19 the gas is carried over red hot copper, in 18 carbon dioxide and part of the water are removed, and in 17 the gas is completely dried. From the compressor 20 the purified gas passes via the three-way cock 21, either through the conduit 22 directly into chamber 3, or by conduit 23, flexible conduit 14, body 11 and tube 10 again into the bore hole. In the latter case, the tubes 14, 11 and 10 are blown out. If desired, the compressor, the purifying means and the high and low pressure chambers may be mounted on a car.

As the depth of the bore is increased, it becomes necessary from time to time to increase the length of tube 10. In Figs. 3, 4 and 5, the construction of body 11, which provides for the lengthening of tube 10, is better shown. Tube 10 is rigidly connected with the body 11 by a gland stuffing box 24 and discharges in a chamber 25 of the body 11. The chamber 25 is provided with a flanged socket 26 connected to the flexible tube 14.

The body 11 can be lifted and lowered together with tube 10, the latter sliding in the gland 27 in the cover of chamber 3. When the bore hole becomes deeper, tube 10 is lowered more and more and as it must slide through the gland 27 it must be of uniform diameter and must have a smooth surface. As the tube is elongated by screwing on new parts, it is necessary to screw on a new part without releasing the pressure in the tube. Therefore, the body 11 has a cock 28, above which the body 11 has a flanged socket with a gland 29. If the tube 10 must be elongated, a new part is put in the socket above cock 28 and tightened by the gland 29. The new part of the tube is closed by a cap 30 on the upper side. Now the cock 28 is opened. The new part is lowered through body 11 and screwed onto tube 10 in the chamber 25, without loss of gas due to the provision of the gland 29. After the new part has been screwed onto tube 10, the body 11 is lifted and slides over the tube until the gland 29 touches the flange 31 of the cap 30. The cap 30 and the gland 29 are now connected to provide a gas-tight joint and the body 11 is lifted again until the end of tube 10 is separated from the cap 30 and its open end is within chamber 25. After cock 28 is shut, the cap 30 may be removed from the gland 29 and may be used again by putting it on a new part of the tube. The tube 10 is again rigidly connected with the body 11 by tightening gland 24, so that both can be moved downward together as required by the periodic removal of the molten slag. The above-described operation may be effected without the escape of gas.

Fig. 6 shows a modified construction of the chamber 3. At its lower end it is connected with a steel cylinder 40 by flanges 41 and bolts 42. The cylinder 40 with the bolts 42 and the tube 43 are shown anchored in a heavy block of concrete 45. Within the lower part of the cylinder 40 extends a tube 43 which constitutes the beginning of the bore hole. This tube consists preferably of a material having a small coefficient of heat expansion, for instance, a quartz or cement, which may be fused to the underlying earth strata or rock. Tightness between the cylinder 40 and the tube 43 may be provided by means of a lead packing. If a gas under pressure is admitted in the bore hole, it will exert a pressure on the chamber 3 tending to lift it, but this pressure will be taken up by the bolts 42 embedded in the block of concrete, so that the chamber 3 and cylinder 40 cannot move with respect to the tube 43.

With this construction, the beginning of the boring takes places in tube 43 in which the electrodes are lowered. If, in the beginning of the boring, the earth strata cannot withstand the highest pressure, which will be required in making the bore hole, the boreing is first effected with a lower pressure until strata of the desired resistances are reached. The part of the bore hole which is made without application of the maximum pressure may be reinforced by steel tubes 40, and the tightness between the wall of the bore hole and the steel tubes may be ensured by pouring cement between said wall and the steel tubes. The part of the bore hole reinforced by the steel tubes and the steel tubes themselves must have a sufficient diameter to let the electrodes, etc., pass without touching them.

In order to ensure the distance between the free pending electrodes and to maintain generally the position of these electrodes and the tube 10 with respect to each other and with respect to the wall of the bore hole as uniform as possible, distancing pieces 46 are provided at various heights as shown in Fig. 7. They consist preferably of electrical insulating material, such as rubber, and they are so elastic that they adhere to the conductors and the exhaust tube and therefore are lowered and lifted therewith but yet may slide over them. When the tube 10 and the conductor 4 are lifted, the distancing pieces 46 are lifted until they reach the cover 48 which retains them until they all lay one on the other when the electrodes are fully lifted.

In order to prevent the distancing pieces all being carried down together when the electrodes and tube 10 are lowered, a fork 49 is provided which can be actuated in a manner similar to that of the valve 32. As soon as the electrodes are lowered, the fork is put in a position within the chamber 3 to retain the distancing pieces until the electrodes are lowered over such a distance that a distancing piece is required. When the fork is withdrawn, the electrodes are lowered over a distance equal to the thickness of one distancing piece and the fork is again forwarded to its retaining position. Thus, only one distancing piece is lowered at a time with the electrodes. As soon as the electrodes are again lowered over a sufficient distance, a second distancing piece is allowed to do down with them, etc.

Instead of removing the slag through tube 10, a hollow receptacle or chamber 50 may be lowered bodily into the bore hole for the collection and removal of slag. As shown in Fig. 8, chamber 50 is connected to the end of a hollow cable 51 by means of which it is lowered into and removed from the bore hole. The lower end of chamber 50 is provided with an aspirating device 53 for causing slag to be sucked into the chamber 50 by a stream of gas flowing from the bore into the chamber. Cable 51 may be connected to a gas circulating and purifying system, such as shown in Fig. 1 and described in detail hereinbefore. The essential difference between removing slag by the means shown in Fig. 8 and by the tube 10 resides in the fact that the slag is retained in the chamber 50 and is not carried up out of the hole by the circulating gas stream. In order to ensure that the aspirated slag will be maintained in chamber 50 and will not flow up through conduit 51, a filter 52 is provided at the upper end.

When the chamber 50 is full, it can be raised bodily and removed from the bore hole. For this purpose, air locks (not shown) may be provided in the cover of pressure chamber 3 so that the slag chamber 50 may be removed from and reintroduced into the bore hole without leakage of gas or loss of pressure. Cable 51 may be passed through the top of chamber 3 similarly to the conductors 4 to avoid leakage of gas.

The present invention also contemplates the protection of the lower part of the electric conductors and the exhaust tube. In Fig. 9, the lower ends of conductors 69 and exhaust tube 71 are shown protected by a refractory cylindrical body 67. The electrodes 63 and the tube 64 pass through the bottom of the refractory cylindrical body 67, the walls and the bottom proper 65 of which consist preferably of quartz (fused silica). Against the lower side of the bottom 65 is applied a protecting layer 66 of highly refractory material, such as zirconium oxide.

The tube 64 may be formed, for instance, of platinum tubing of a few millimeters diameter. Within the body 67 this small tube has perforations 70, above which the tube is connected to an expanding tube 71 of other material. The gas enters in the tube through the perforations 70, aspirates the slag and atomizes it into the tube 71.

Within the body 67, the electrodes 63 are connected to intermediary connections 68 of nickel which are connected with the copper current conductors 69. If the bore hole is filled with an inert gas or with hydrogen, the electrodes 63 may be made of tungsten or another oxidizable highly refractory metal or alloy. If, however, the bore hole is filled with an oxidizing gas, the electrodes should consist of non-oxidizable material, such as platinum or a platinum rhodium alloy or the like, or they may consist of an oxidizable core with a protecting cover of non-oxidizable material. This cover should extend at least as far as the electrodes extend out of the slag and may be in the form of a platinum jacket. In this case, it is necessary to apply a substance, for instance, a silicate between the platinum and the core to prevent contact between the platinum and the core material (tungsten or the like) in order to avoid the formation of alloys having a low melting point. The electrodes 63 extend a few centimeters below the tube 64 and deviate sufficiently from each other to form a bore hole of sufficient diameter for the passage of the body 67. As the tube 64 is in the center between the electrodes 63, a volt meter connected with the slag exhaust tube will show the average voltage between the electrodes. This voltage remains constant as long as tube 64 contacts with the molten slag 62. However, if this contact as may be expected during the continued aspiration of the slag is continually disrupted, the volt meter will show this by a vibration and this will indicate that the slag is continually removed as desired, but if the tube 64 is obstructed the volt meter will show a constant voltage without vibration. This vibration may also be indicated by a telephone.

The gas introduced in the bore hole enters the cylindrical body 67 and cools the current conductors 69 and the intermediary connection 68 before it enters into the perforations 70 in the platinum tube 64. The gas escapes in the expanding tube 71, aspirating, atomizing and carrying with it the slag. The body 67 is preferably made of fused silica because it is subjected to very different temperatures, namely, on one side to the temperature of the relatively cool gas current and on the other side to the radiation of the hot walls of the bore hole and the slag and the high temperature of the tube 64 and the electrodes 63.

The electrodes used for carrying out the present invention are preferably made of tungsten or similar material, such as molybdenum, tantalum and carbides of refractory metals. In order to avoid oxidation of tungsten, which is strongly attacked by oxygen, water vapor or other oxygen-containing gases, it is important that the gaseous atmosphere maintained in the bore hole be of a non-corroding nature. The gaseous atmosphere may, for instance, consist of nitrogen and/or hydrogen.

In place of the atmosphere of nitrogen and/or hydrogen, an atmosphere of hydrocarbon gases may be used advantageously. For this purpose, liquid hydrocarbons may be introduced into the bore hole and by reason of the high temperature prevailing at the bottom thereof, the liquid hydrocarbons will be cracked, resulting in a deposition of carbon on the tungsten electrodes and the formation of free hydrogen, together with other light hydrocarbons. The carbon deposited on the electrodes forms a protective coating which has no, or only a slight, action on the tungsten. Any oxygen present or formed adjacent the carbon-coated tungsten electrodes will be converted by the carbon coating into carbon dioxide, thereby avoiding the direct action of oxygen on the metal electrodes.

The use of cheap liquid hydrocarbons instead of expensive hydrogen or ammonia gas makes it possible in many cases to dispense with the purification and recovery of the gases circulated through the bore hole and which are used to carry the atomized slag upwardly out of the hole. In many cases, natural earth gases will be available and may be used to form the atmosphere within the bore hole. It is also possible to introduce gasolene or other liquid hydrocarbons into the bore hole since the decomposition of these substances will yield a gas suitable for maintaining the required pressure. While the decomposition of the hydrocarbons absorbs considerable heat which must be generated in and supplied to the bore hole as electrical energy, this is not a serious drawback to the use of liquid hydrocarbons, since the use of the same simplifies the process to such an extent as to justify the heat losses, especially since electrical energy is now generally available at low cost.

In many cases, it will be found advantageous to work with a mixture of hydrogen and hydrocarbons, since such mixtures are generally low in cost and may be formed, for instance, by beginning the boring with pure hydrogen or ammonia gas and adding hydrocarbons to make up for the unavoidable losses during operation and to take care of the increased depth of the bore hole.

From the foregoing description, it will be realized that the present invention is highly advantageous, since it provides for the concentration of a large amount of heat at the bottom of the bore hole. By heating the bottom of the bore hole, not only is a molten slag obtained, but also the rock surrounding the bore hole becomes plastic and due to the pressure maintained in the bore hole is pressed outwardly. An external pressure is exerted in the plastic material which opposes the pressure in the bore hole and as the plastic material becomes gas-tight, an equilibrium will be set up and the bore hole will obtain a definite form. It is possible to drill the bore hole in accordance with the present invention without the use of any reinforcement, except possibly near the surface where it may be necessary, due to the low external pressure surrounding the bore hole to provide an intermediate reinforcing structure.

Since the electrodes are freely suspended, the bore hole will be truly vertical and will be of the same diameter throughout its depth. In accordance with the present invention, bore holes of from 20 to 30 cm. in diameter of any desired depth may be made. It will be realized that the present invention which permits the boring of holes of such depth is highly advantageous over the prior art methods in which the depth of the hole is nearly always limited by the failure of the apparatus or the enormous expense entailed. The boring in accordance with the present invention proceeds very rapidly and as the heat is applied to the material to be melted in a very efficient manner, little energy is required to melt the material and therefore the process may be carried out at a much lower cost than is involved in any of the known methods.

If several oil layers are passed during the drilling, it is possible to make openings in the side wall of the bore hole, for instance, by floating a layer of hydrofluoric acid on a heavy oil in the bore hole at the proper level so that the acid acts on the wall to permit access to the oil layer.

It is possible to enlarge the bottom part of the bore hole by maintaining the electrodes a considerable time at the lowest point. In this way an enlargement at the bottom of the bore hole is obtained which, after breaking of the walls, ensures an easy flow of oil. It is also possible to make such an enlargement of the bore hole in places where oil bearing strata occur. The composition of the strata through which the bore proceeds is indicated by the composition of the atomized slag which is recovered in the dust chambers.

While in the foregoing description reference has been made to an apparatus in which three electrodes are used with a three-phase alternating current, it should be understood that any numbers of electrodes may be employed and that any kind of suitable electric current may be utilized for effecting the heating. For instance, two electrodes supplied with energy from a common alternating current supply line are satisfactory.

The present invention is also advantageous in that a number of drawbacks of the usual methods are avoided. For instance, the possibility of water flowing from one layer along the bore hole to an oil layer is avoided by reason of the hardened wall of solidified molten material with which the bore hole is lined, being impervious to the various layers of oil and water through which the bore is made.

While we have shown and described the preferred embodiment of our invention, we wish it to be understood that we do not confine ourselves to the precise details herein set forth by way of illustration as it is apparent that many changes and variations may be made therein by those skilled in the art, without departing from the spirit of the invention or exceeding the scope of the appended claims.

What we claim is:

1. A method of making vertical bore holes wherein the material, in which the boring takes place, is molten by passing an electric current between electrodes immersed in a molten slag at the bottom of the bore hole.

2. A method of making vertical bore holes wherein the material in which the boring takes place, is molten by passing an alternating electric current between electrodes, immersed in a molten slag at the bottom of the bore hole.

3. A method of making vertical bore holes wherein the material, in which the boring takes place, is molten by passing a three phase alternating electric current between electrodes immersed in a molten slag at the bottom of the bore hole.

4. A method of making vertical bore holes wherein the material, in which the boring takes place, is molten by passing an electric current between electrodes immersed in a molten slag at the bottom of the bore hole, maintaining a pressure in the bore hole and removing the molten slag at least partly upwards out of the bore hole.

5. A method of making vertical bore holes wherein the material, in which the boring takes place, is molten by passing an electric current between electrodes immersed in a molten slag at the bottom of the bore hole, maintaining a pressure in the bore hole and using this pressure for removing molten material from the bottom of the bore hole.

6. A method of making vertical bore holes wherein the material, in which the boring takes place, is molten by passing an electric current between electrodes immersed in a molten slag at the bottom of the bore hole, maintaining a pressure on the bore hole superior to the pressure in or of the surrounding strata.

7. A method of making vertical bore holes wherein the material in which the boring takes place, is molten by passing an electric current between electrodes immersed in a molten slag at the bottom of the bore hole, maintaining a pressure in the bore hole superior to the pressure in or of the surrounding strata and using this pressure for removing molten material from the bottom of the bore hole.

8. A method of making vertical bore holes wherein the material, in which the boring takes place, is molten by passing an electric current between electrodes immersed in a molten slag at the bottom of the bore hole, maintaining a pressure in the bore hole superior to the pressure in or of the surrounding strata and using this pressure for removing molten material from the bottom of the bore hole and carrying it in pulverized condition out of the bore hole.

9. A method of making vertical bore holes wherein the material in which the boring takes place, is molten by passing an electric current between electrodes immersed in a molten slag at the bottom of the bore hole, and maintaining a pressure of a non-oxidizing atmosphere in the bore hole.

10. A method of making vertical bore holes wherein the material, in which the boring takes place, is molten by passing an electric current between electrodes immersed in a molten slag at the bottom of the bore hole, and maintaining a pressure of a non-oxidizing atmosphere in the bore hole by introducing hydrocarbons into the bore hole.

11. A method of making vertical bore holes wherein the material, in which the boring takes place, is molten by passing an electric current between electrodes immersed in a molten slag at the bottom of the bore hole, and maintaining a pressure of a non-oxidizing atmosphere in the bore hole superior to the pressure in or of the surrounding strata and using this pressure for removing molten material from the bottom of the bore hole.

12. A method of making vertical bore holes wherein the material in which the boring takes place, is molten by passing an electric current between electrodes immersed in a molten slag at the bottom of the bore hole, maintaining a high pressure gas current in the bore hole and using said current for removing molten slag from the bottom of the bore hole.

13. A method of making vertical bore holes wherein the material in which the boring takes place, is molten by passing an electric current between electrodes immersed in a molten slag at the bottom of the bore hole, maintaining a high pressure gas current of a non-oxidizing gas in the bore hole and using said current for removing molten slag from the bottom of the bore hole, purifying the gas after its passage through the bore hole and then returning it into the bore hole.

14. A method of making vertical bore holes wherein the material, in which the boring takes place, is molten by passing an electric current between electrodes immersed in a molten slag at the bottom of the bore hole, maintaining periodically a high pressure gas current in the bore hole and using said current for removing molten slag from the bottom of the bore hole.

15. A method of making vertical bore holes wherein the material, in which the boring takes place, is molten by passing an electric current between electrodes immersed in a molten slag at the bottom of the bore hole, maintaining periodically a high pressure gas current of a non-oxidizing gas in the bore hole and using said current for removing molten slag from the bottom of the bore hole, purifying the gas after its passage through the bore hole and then returning it into the bore hole.

16. A method of making vertical bore holes wherein the material, in which the boring takes place, is molten by passing an electric current between electrodes immersed in a molten slag at the bottom of the bore hole, maintaining a high pressure gas current, descending to near the bottom of the bore hole and using the ascending part of said current for aspirating molten slag from the bottom of the bore hole and for carrying it in pulverized condition out of the bore hole.

17. A method of making vertical bore holes wherein the material, in which the boring takes place, is molten by passing an electric current between electrodes immersed in a molten slag at the bottom of the bore hole, maintaining a high pressure gas current, descending to near the bottom of the bore hole and using the ascending part of said current for aspirating molten slag from the bottom of the bore hole and for carrying it in atomized condition out of the bore hole, purifying the gas from slag and oxidizing compounds outside of the bore hole and returning it to the bore hole in purified condition.

18. A method of making vertical bore holes wherein the material, in which the boring takes place, is molten by passing an electric current between electrodes immersed in a molten slag at the bottom of the bore hole, maintaining a moderate pressure in the beginning of the boring conform to the relatively small resistibility of the upper earth layers and on further boring increasing the pressure to above the maximum pressure to be expected.

19. A method of making vertical bore holes wherein the material, in which the boring takes place, is molten by passing an electric current between electrodes immersed in a molten slag at the bottom of the bore hole, maintaining a moderate pressure in the beginning of the boring conform to the relatively small resistibility of the upper earth layers reinforcing the upper part of the bore hole in which this moderate pressure has been applied and on further boring increasing the pressure to above the maximum pressure to be expected.

CHRISTIANUS JOSEPHUS
    GODEFRIDUS AARTS.
JOHANNES ANTONIUS
    ALPHONSUS MEKEL.